US012080075B2

(12) United States Patent
Kutschera et al.

(10) Patent No.: US 12,080,075 B2
(45) Date of Patent: Sep. 3, 2024

(54) METHOD FOR GENERATING AN IMAGE OF VEHICLE SURROUNDINGS, AND APPARATUS FOR GENERATING AN IMAGE OF VEHICLE SURROUNDINGS

(71) Applicant: Conti Temic microelectronic GmbH, Nuremberg (DE)

(72) Inventors: Thomas Kutschera, Illerkirchberg (DE); Joachim Wiest, Neu-Ulm (DE); Markus Friebe, Gefrees (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 304 days.

(21) Appl. No.: 17/595,681

(22) PCT Filed: May 12, 2020

(86) PCT No.: PCT/DE2020/200034
§ 371 (c)(1),
(2) Date: Nov. 22, 2021

(87) PCT Pub. No.: WO2020/233755
PCT Pub. Date: Nov. 26, 2020

(65) Prior Publication Data
US 2022/0222947 A1 Jul. 14, 2022

(30) Foreign Application Priority Data
May 21, 2019 (DE) .................... 10 2019 207 415.4

(51) Int. Cl.
*G06V 20/58* (2022.01)
*B60R 1/27* (2022.01)
(Continued)

(52) U.S. Cl.
CPC ............... *G06V 20/58* (2022.01); *B60R 1/27* (2022.01); *B60W 40/12* (2013.01); *G06T 7/55* (2017.01);
(Continued)

(58) Field of Classification Search
CPC ........ G06V 20/58; G06V 20/586; B60R 1/27; B60R 2300/605; B60R 2300/607;
(Continued)

(56) References Cited

U.S. PATENT DOCUMENTS

2011/0001826 A1* 1/2011 Hongo ................... H04N 7/183
348/148
2012/0293660 A1* 11/2012 Murakami ........... G06V 20/586
348/148
(Continued)

FOREIGN PATENT DOCUMENTS

CN 103802725 A 5/2014
CN 104093600 A 10/2014
(Continued)

OTHER PUBLICATIONS

Decision to Grant a Patent drafted Jul. 11, 2023 for the counterpart Japanese Patent Application No. 2021-564734 and Global Dossier translation of same.
(Continued)

*Primary Examiner* — Bobbak Safaipour
*Assistant Examiner* — Jongbong Nah (57) ABSTRACT

A method and apparatus for generating an image of vehicle surroundings are disclosed, including: capturing vehicle surroundings by vehicle cameras arranged on a vehicle body of a vehicle, and generating camera images by the cameras. The camera images of adjacent cameras have overlapping image regions), generating a virtual representation of the surroundings in a virtual three-dimensional space, during
(Continued)

which the camera images are projected onto a virtual projection surface in the space. A non-stationary virtual camera in the virtual space determines a position and/or orientation thereof. A first selection region is placed on the surface in a first overlapping image region depending on a virtual camera field of vision, at least one image parameter of a first vehicle camera in the first selection region is calculated, and at least one second vehicle image parameter is adjusted to the at least one first vehicle image parameter in the first selection region.

20 Claims, 4 Drawing Sheets (51) Int. Cl.
  *B60W 40/12* (2012.01)
  *G06T 7/00* (2017.01)
  *G06T 7/55* (2017.01)
  *G06T 7/90* (2017.01)
(52) U.S. Cl.
  CPC ............... *G06T 7/90* (2017.01); *G06T 7/97* (2017.01); *B60W 2420/403* (2013.01)
(58) Field of Classification Search
  CPC ... B60R 1/00; B60W 40/12; B60W 2420/403; G06T 7/55; G06T 7/90; G06T 7/97; G06T 5/94; G06T 2207/10012; G06T 2207/30264; G06T 5/50; G06T 2207/20221; G06T 15/04; G06T 15/506; G06T 15/503
  See application file for complete search history.

(56) References Cited

U.S. PATENT DOCUMENTS

| | | |
|---|---|---|
| 2013/0215269 A1 | 8/2013 | Hsieh et al. |
| 2014/0160275 A1 | 6/2014 | Sakakibara et al. |
| 2014/0292805 A1* | 10/2014 | Yamada .................. G09G 5/00 345/629 |
| 2014/0347450 A1* | 11/2014 | Han .......................... B60R 1/27 348/47 |
| 2014/0347470 A1* | 11/2014 | Zhang ..................... B60R 11/04 382/104 |
| 2016/0080699 A1 | 3/2016 | Scholl et al. |
| 2020/0351481 A1 | 11/2020 | Kokido et al. |
| 2020/0396394 A1 | 12/2020 | Deegan |
| 2020/0406920 A1* | 12/2020 | Kumano ........... B60W 30/0956 |

FOREIGN PATENT DOCUMENTS

| | | | | |
|---|---|---|---|---|
| CN | 106575432 A | 4/2017 | | |
| CN | 108876719 A | 11/2018 | | |
| DE | 102013211650 A1 * | 12/2014 | .......... | G06T 3/4038 |
| DE | 102014207897 A1 | 10/2015 | | |
| DE | 102014210323 A1 | 12/2015 | | |
| DE | 102016124978 A1 | 6/2018 | | |
| DE | 102016124989 A1 * | 6/2018 | .............. | B60R 1/00 |
| DE | 102016226299 A1 | 7/2018 | | |
| DE | 102017123452 A1 | 4/2019 | | |
| JP | 2013207637 A | 10/2013 | | |
| JP | 2014110627 A | 6/2014 | | |
| WO | 2019073589 A1 | 4/2019 | | |

OTHER PUBLICATIONS

Chinese First Office Action dated Sep. 7, 2023 for the counterpart Chinese Patent Application No. 202080037166.4 and DeepL translation of same.
Notice of Reasons for Refusal drafted Nov. 9, 2022 for the counterpart Japanese Patent Application No. 2021-564734.
German Search Report dated Aug. 29, 2019 for the counterpart German Patent Application No. 10 2019 207 415.4.
International Search Report and the Written Opinion of the International Searching Authority mailed on Nov. 6, 2020 for the counterpart PCT Application No. PCT/DE2020/000334.
Chinese Second Office Action dated Mar. 27, 2024 for the counterpart Chinese Patent Application No. 202080037166.4 and machine translation of same.

* cited by examiner

METHOD FOR GENERATING AN IMAGE OF VEHICLE SURROUNDINGS, AND APPARATUS FOR GENERATING AN IMAGE OF VEHICLE SURROUNDINGS

CROSS REFERENCE TO RELATED APPLICATIONS

This application claims priority to PCT Application PCT/DE2020/200034, filed May 12, 2020, which claims priority to German Application DE 10 2019 207 415.4, filed May 21, 2019. The disclosures of the above applications are incorporated herein by reference.

FIELD OF INVENTION

The invention relates to a method as well as an apparatus for generating an image of vehicle surroundings.

BACKGROUND

Vehicles are increasingly being equipped with driver assistance systems which support the driver during the performance of driving maneuvers. These driver assistance systems contain, in part, camera surround view systems which allow the vehicle surroundings to be displayed to the driver of the vehicle. Such camera surround view systems comprise a plurality of vehicle cameras which supply real images of the vehicle surroundings, which are in particular assembled by a data processing unit of the camera surround view system to produce an environment image of the vehicle surroundings. The image of the vehicle surroundings is then advantageously displayed to the driver on a display unit. In this way, the driver can be supported during a vehicle maneuver, for example when the vehicle is reversing or during a parking maneuver.

The camera images supplied by the adjacent vehicle cameras overlap in overlapping regions. If the vehicle cameras are located on various sides of the vehicle, it can be the case that the light conditions are different for the different vehicle cameras. For example, the sunlight can shine on the surroundings of the vehicle from one side. Moreover, the route traveled can result in different light conditions for the various vehicle cameras. If, for example, a vehicle drives into a vehicle tunnel, the surroundings of the front vehicle camera are suddenly dark, while the surroundings of the rear vehicle camera are well illuminated by the daylight. In the case of conventional surround view systems, within the assembled overall image or surround view image, image artefacts, in particular brightness steps, therefore occur within the overall image, which are caused by the different lighting conditions for the different vehicle cameras.

SUMMARY

Starting from this, it is now an object of the present disclosure to provide a method or an apparatus with which the existing problems based on the brightness differences of adjacent vehicle cameras can be remedied.

The object is addressed by a method having the features of the independent claim 1. An apparatus is the subject-matter of the alternative independent claim. Example embodiments are the subject-matter of the subclaims.

According to a first aspect, the present disclosure relates to a method for generating an image of vehicle surroundings, comprising:

capturing the vehicle surroundings by means of a plurality of vehicle cameras which, in particular, are arranged on a vehicle body of a vehicle, generating camera images by means of the plurality of vehicle cameras, wherein the camera images of adjacent vehicle cameras have overlapping image regions, generating a virtual representation of the surroundings in a virtual three-dimensional space, wherein, during the generation, the camera images are projected onto a virtual projection surface in the three-dimensional virtual space, providing a non-stationary virtual camera in the virtual space and determining a virtual camera position and/or a virtual camera orientation, placing a first selection region on the virtual projection surface in a first overlapping image region depending on a field of vision of the virtual camera, calculating at least one image parameter of a first vehicle camera in the first selection region, and adjusting at least one image parameter of a second vehicle camera to the at least one image parameter of the first vehicle camera in the first selection region.

The method according to the present disclosure ensures in particular that the image quality in a three-dimensional virtual depiction of the surround view can be improved in the visible regions. Furthermore, the brightness differences of adjacent cameras can be remedied by the method according to the present disclosure.

The method steps are in particular performed in the indicated order.

The fact that adjacent vehicle cameras capture at least partially the same region means that camera images of adjacent vehicle cameras or adjacent camera images accordingly have overlapping image regions. In other words, the fact that fields of vision of adjacent vehicle cameras at least partially overlap means that adjacent vehicle cameras accordingly have overlapping regions.

The virtual representation of the surroundings in the virtual three-dimensional space may be generated by a computing unit. In this case, the virtual representation is or comprises in particular a three-dimensional representation of the surroundings.

In an example configuration, the virtual projection surface can comprise a curved virtual projection surface or can be configured as such. The projection surface can be curved in certain regions or entirely. The virtual projection surface is advantageously configured in the form of a bowl. In particular, the virtual projection surface which is configured in the form of a bowl has a substantially planar bottom. The substantially planar bottom may turn into curved side walls.

Within the meaning of the present disclosure, the selection region can be an individual pixel. However, it can also be a region or a multiplicity of pixels. It is beneficial if the region chosen is as small as possible. As a result, a visual quality which is as good as possible can be created. The quality can be further improved if a plurality of measuring points is chosen in the region or in a smaller region.

The vehicle cameras may be cameras of a surround view system. There are in particular four cameras which are ideally arranged on different sides of the vehicle. One vehicle camera may be arranged on a front side, one vehicle camera is arranged on a rear side, one vehicle camera is arranged on a left side and one vehicle camera is arranged on a right side of the vehicle. The vehicle cameras can be configured as fisheye cameras. It is beneficial that the plurality of vehicle cameras is configured to be of identical construction.

In an example configuration of the present disclosure, a second selection region is placed on the virtual projection surface within a second overlapping image region depending on the field of vision of the virtual camera. In a further step, at least one image parameter of a further vehicle camera, the camera image of which has the second overlapping image region, is calculated in the second selection region. The further vehicle camera may be a third vehicle camera. However, it is also possible that the vehicle camera is the second vehicle camera. In a next step, at least one image parameter of another vehicle camera, the camera image of which likewise has the second overlapping image region, is adjusted to the at least one image parameter of the further vehicle camera in the second selection region. The other vehicle camera may be the second vehicle camera. However, the other vehicle camera can also be a third vehicle camera.

The selection regions, in particular the first or the second selection region, may be independent of the position of the other region. In particular, the first and the second selection region are located on different axes and/or at different heights. In particular, the selection regions are not located on the same coordinate axis. When the virtual three-dimensional space is viewed, the two selection regions are in particular located on different planes or at different heights in the virtual three-dimensional space.

Advantageously, an image and/or image parameters of the vehicle camera, which has the first and the second overlapping image region, is/are adjusted between the first and the second selection region by means of a (local) interpolation or by means of an interpolation function. In addition, the established image parameters in the selection regions are in particular considered. The vehicle camera may be the second vehicle camera. A particularly soft visual transition between the selection regions can be created by means of the interpolation.

In a configuration, a linear interpolation can be utilized, wherein the formula can be written as follows: (1-alpha*a+ alpha*b. Alpha can lie in a region between 0 and 1 and describes the distance between a selection region a and a selection region b, wherein the distance can be described by 3D vectors.

In a configuration of the present disclosure, the position of the selection region or the positions of the selection regions is/are considered during the interpolation. The three-dimensional position of the selection region or the three-dimensional position of the selection regions may be considered. Either additionally or alternatively, the X, Y and Z coordinate values of a currently rendered point, which lies in particular between the first and the second selection region, can be considered. A plurality of coordinate values may be considered if the selection regions are not arranged on and/or along the same coordinate axis. That is to say, not only X coordinate values, but in addition also Y and/or Z coordinate values are in particular considered. As a result, an application of harmonization values, which is more flexible and capable of adjustment to a greater degree, can in particular be achieved. During the known methods, the interpolation between the brightness differences is only applied along an axis, for example an X axis; the other values, for example the Y and Z values, are not considered.

In an example configuration, the placement of a selection region, in particular of a first and/or a second selection region, is effected in that the selection region is placed at a standard position within an overlapping image region, in a first step. The image region can be both the first and the second overlapping image region. In a further or subsequent step, it is then verified whether the selection region is visible to the virtual camera at the standard position. For example, the selection region cannot then be visible to the virtual camera if the selection region lies outside of the field of vision of the virtual camera, in particular outside of the field of view. A further reason can be that a virtual vehicle model, which is enclosed by the virtual projection surface, is integrated in the virtual three-dimensional space. Here, the vehicle model then lies in particular substantially between the position of the virtual camera and the selection region.

If the selection region is visible to the virtual camera, the selection region then may remain at the standard position. If, however, the selection region is not visible to the virtual camera, this can then be displaced on the virtual projection surface within the overlapping image region. The selection region is in particular displaced until such time as it becomes visible to the virtual camera.

The standard position can be stored in a memory. It is beneficial if, during the execution of the method according to the present disclosure, the selection region is placed onto the standard position first of all.

The selection region can be placed, or can be placed again, onto the standard position if it emerges during the verification that there is no selection region within the overlapping image region which is visible to the virtual camera. Consequently, the standard position can in particular also be used as an evasive position or as a fallback position.

In an advantageous configuration of the present disclosure, parameters of a vehicle model are provided, wherein the parameters may be integrated in the virtual three-dimensional space. The parameters can advantageously be at least the height and/or the length and/or the width of a vehicle. It is, however, also conceivable that the parameters are a virtual vehicle model. The parameters may be stored in a model memory.

The virtual projection surface may enclose the parameters of the vehicle model in the virtual space. If the virtual projection surface is configured in the form of a bowl and has a substantially planar bowl bottom, then the parameters of the vehicle model or the virtual vehicle model may be arranged on the bottom. The parameters of the vehicle model or the virtual vehicle model may be particularly substantially arranged in the middle on the bottom.

The image parameters may be an image brightness, an image contrast, an image color, an image sharpness, a color saturation and/or a texture frequency.

In an advantageous configuration, the first vehicle camera is a front vehicle camera. The first vehicle camera substantially has a field of vision which captures a region in front of the vehicle. If the first vehicle camera is a front vehicle camera, then the third camera may be a rear vehicle camera. The rear vehicle camera substantially has a field of vision which captures a region behind the vehicle. The front and the rear vehicle camera may point in opposite directions and/or may have the same optical axis. It is, however, also conceivable that the first vehicle camera is a rear vehicle camera and/or the third vehicle camera is a front vehicle camera.

In an example configuration of the present disclosure, the second vehicle camera is a lateral vehicle camera. The vehicle camera substantially has a field of vision which captures a region next to the vehicle. The second vehicle camera may particularly be a left or a right vehicle camera. The second vehicle camera can be arranged on an exterior mirror of a vehicle.

In a particularly advantageous configuration of the present method, the image parameters of the left and/or the right vehicle camera, in particular the brightness of the left and/or right camera images, is/are adjusted to the image parameters of the front and/or of the rear vehicle camera, in particular to the brightness of the front and/or rear camera images. As a result, the image parameters of the left and/or the right vehicle camera then correspond in particular to the image parameters of the front and/or of the rear vehicle camera at connection points. This can be achieved according to the present disclosure in that the first vehicle camera is a front vehicle camera, the further vehicle camera is a rear vehicle camera, and the second and the other vehicle camera is one and the same vehicle camera and corresponds to a lateral vehicle camera. Furthermore, this can be achieved in that the first vehicle camera is a rear vehicle camera, the further vehicle camera is a front vehicle camera, and the second and the other vehicle camera is one and the same vehicle camera and corresponds to a lateral vehicle camera.

According to a second aspect, the present disclosure relates to an apparatus for generating an image of vehicle surroundings, having
a plurality of vehicle cameras for capturing the vehicle surroundings and producing camera images, wherein the camera images of adjacent vehicle cameras have overlapping image regions, and wherein the vehicle cameras are in particular mounted on a vehicle bodywork of a vehicle,
a computing unit which is designed to generate a virtual representation of the surroundings in a virtual three-dimensional space, wherein, during said generation, the camera images are projected onto a virtual projection surface in the three-dimensional virtual space, and
a non-stationary virtual camera;
wherein the computing unit is furthermore designed to place a first selection region on the virtual projection surface in a first overlapping image region depending on a field of vision of the virtual camera and to calculate at least one image parameter of the first vehicle camera in the first selection region and to adjust at least one image parameter of a second vehicle camera in the first selection region to the at least one image parameter of the first vehicle camera.

The apparatus is in particular suitable for performing the method according to the present disclosure.

The virtual camera can be freely moved or is freely movable in the virtual three-dimensional space. The virtual camera orientation can also be freely moved. Consequently, each region in the surroundings of the vehicle, which is captured by the vehicle cameras, can in particular be viewed.

In an example configuration of the apparatus according to the present disclosure, the computing device is designed to place a second selection region on the virtual projection surface within a second overlapping image region depending on the field of vision of the virtual camera, to calculate at least one image parameter of a further vehicle camera, the camera image of which has the second overlapping image region, in the second selection region and to adjust at least one image parameter of another vehicle camera, the camera image of which likewise has the second overlapping image region, to the at least one image parameter of the further vehicle camera in the second selection region. The computing unit can furthermore be designed in such a way that image parameters of the vehicle camera, which has the first and the second overlapping image region or the first and the second selection region, are adjusted between the first and the second selection region by means of an interpolation.

BRIEF DESCRIPTION OF THE DRAWINGS

Further advantageous configurations are set out in the drawings, wherein.

DETAILED DESCRIPTION

Figure 1:
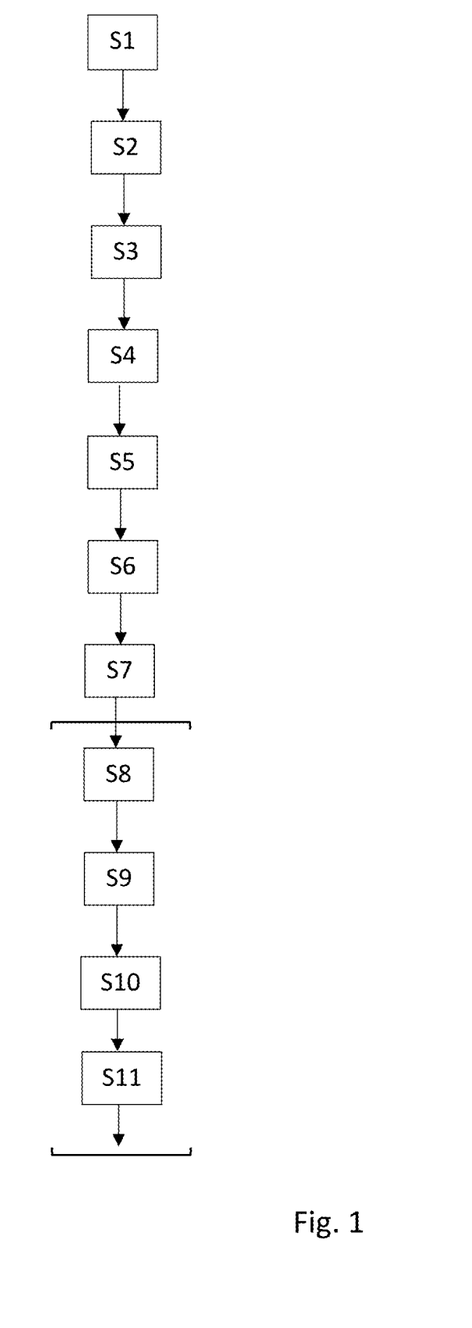
FIG. 1: shows a schematic representation of a flow chart of a method according to the present disclosure in one configuration.

FIG. 1 shows a schematic representation of a flow chart of a method according to the present disclosure for generating an image of vehicle surroundings in one configuration.

In a first method step S1, the vehicle surroundings are captured by means of a plurality of vehicle cameras 12, 14, 16, 18. The vehicle cameras 12, 14, 16, 18 are in particular arranged on a vehicle bodywork of a vehicle. In a step S2, camera images are generated by means of the plurality of vehicle cameras 12, 14, 16, 18, wherein the camera images of adjacent vehicle cameras 12, 14, 16, 18 have overlapping image regions 40, 42, 44, 46.

In a third step S3, a virtual representation of the surroundings is then generated in a virtual three-dimensional space 60. In this case, the camera images are also projected onto a virtual projection surface 62. In a fourth step S4, a non-stationary, virtual camera 48 is provided in the virtual space 60. Furthermore, a virtual camera position and/or a virtual camera orientation is/are also calculated.

According to an example configuration, parameters of a vehicle model or a vehicle model as such can in addition be provided, wherein the parameters or the vehicle model may be integrated in the virtual three-dimensional space.

In a fifth step S5, a first selection region 56 on the virtual projection surface 62 is determined in a first overlapping image region 40 depending on a field of vision 50 of the virtual camera 48. The first selection region 56 is determined in particular by placing the selection region 56' at a standard position within an overlapping image region in a first step. In a following step, it is then verified whether the selection region 56' is visible to the virtual camera 48 at the standard position. If the selection region is visible to the virtual camera 48, then the selection region may remain at the standard position. However, if the selection region 56' is not visible to the virtual camera 48, then the latter is displaced on the virtual projection surface 62 within the overlapping image region 40.

If a first selection region 56 has been determined, then at least one image parameter of a first vehicle camera 12 is determined in the first selection region 56 in a sixth step S6. In a subsequent seventh step S7, at least one image parameter of a second vehicle camera 14 is adjusted to the at least one image parameter of the first vehicle camera 12 in the first selection region 56.

As depicted in FIG. 1, further selection regions can also be determined in addition to the determination of a first selection region. To this end, a second selection region 58 is determined on the virtual projection surface 62 within a second overlapping image region 42 depending on the field of vision 50 of the virtual camera 48, in particular, in an eighth step S8. The second selection region 58 can be determined in a similar manner to the determination of the first selection region 56. If a second selection region 58 is placed, then at least one image parameter of a further vehicle camera 16, the camera image of which has the second overlapping image region 42, may be calculated in the second selection region 58 in a step S9. In a step S10, at least one image parameter of another vehicle camera 14, the camera image of which likewise has the second overlapping image region 42, may then be adjusted to the at least one image parameter of the further vehicle camera 16 in the second selection region 58. In a step S11, the image parameters of the vehicle camera 14, which have both the first 40 and the second overlapping image region 42, can then be calculated between the first 56 and the second selection region 58 by means of an interpolation.

Figure 2:
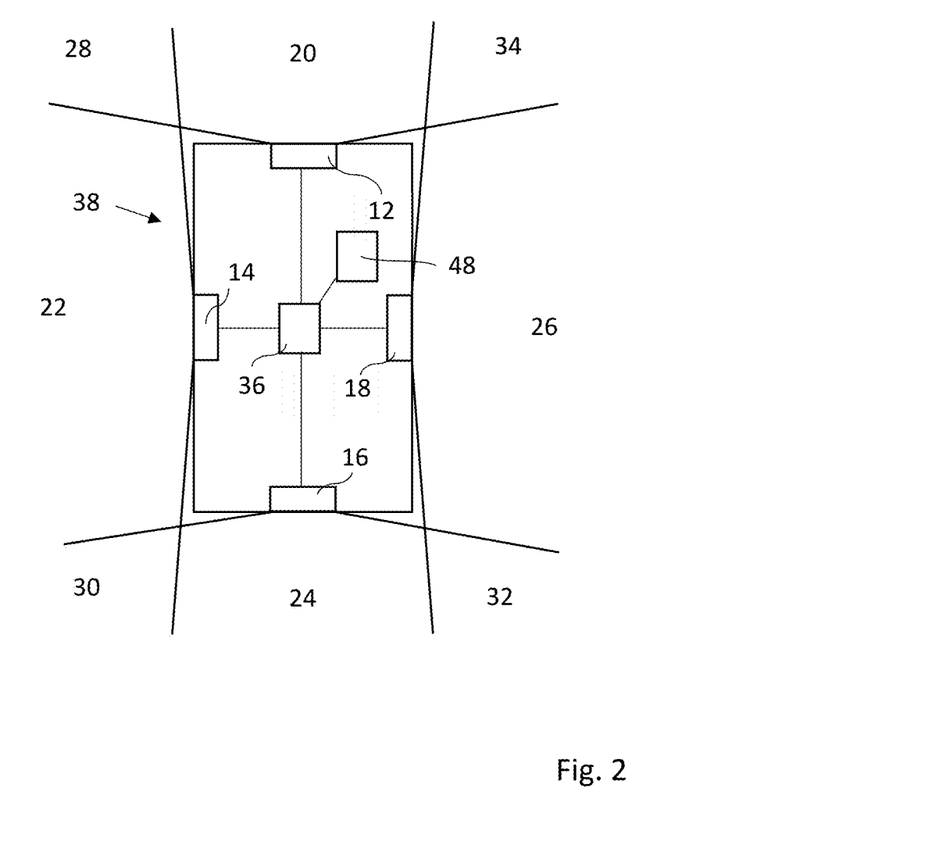
FIG. 2: shows a schematic representation of an apparatus according to the present disclosure in one configuration.

FIG. 2 shows a schematic depiction of an apparatus 38 according to the present disclosure in one configuration. The apparatus 38 has a plurality of vehicle cameras 12, 14, 16, 18 for capturing the vehicle surroundings and producing camera images. Fields of vision 20, 22, 24, 26 of adjacent vehicle cameras 12, 14, 16, 18 overlap at least partially. As a result, adjacent vehicle cameras 12, 14, 16, 18 accordingly have overlapping regions 28, 30, 32, 34. In addition, camera images of adjacent vehicle cameras 12, 14, 16, 18 can have overlapping image regions 40, 42, 44, 46 as a result.

As can be seen in FIG. 2, the apparatus 38 can furthermore have a non-stationary virtual camera 48. Moreover, the apparatus 38 also comprises a computing unit 36. The computing unit 36 is configured in such a way that a virtual representation of the surroundings is generated in a virtual three-dimensional space 60, wherein, during said generation, the camera images are projected onto a virtual projection surface 62 in the three-dimensional virtual space 60. Furthermore, the computing unit 36 is designed to place a first selection region 56 on the virtual projection surface 62 in a first overlapping image region 56 depending on a field of vision 50 of the virtual camera 48 and to calculate at least one image parameter of a first vehicle camera 12 in the first selection region and to adjust at least one image parameter of a second vehicle camera 14 to the at least one image parameter of the first vehicle camera 12 in the first selection region 56. The vehicle cameras 12, 14, 16, 18 are advantageously cameras of a surround view system, wherein a total of four cameras are present and one vehicle camera 12 is arranged on a front side, one vehicle camera 16 is arranged on a rear side, one vehicle camera 14 is arranged on a left side and one vehicle camera 18 is arranged on a right side of the vehicle.

Figure 3:
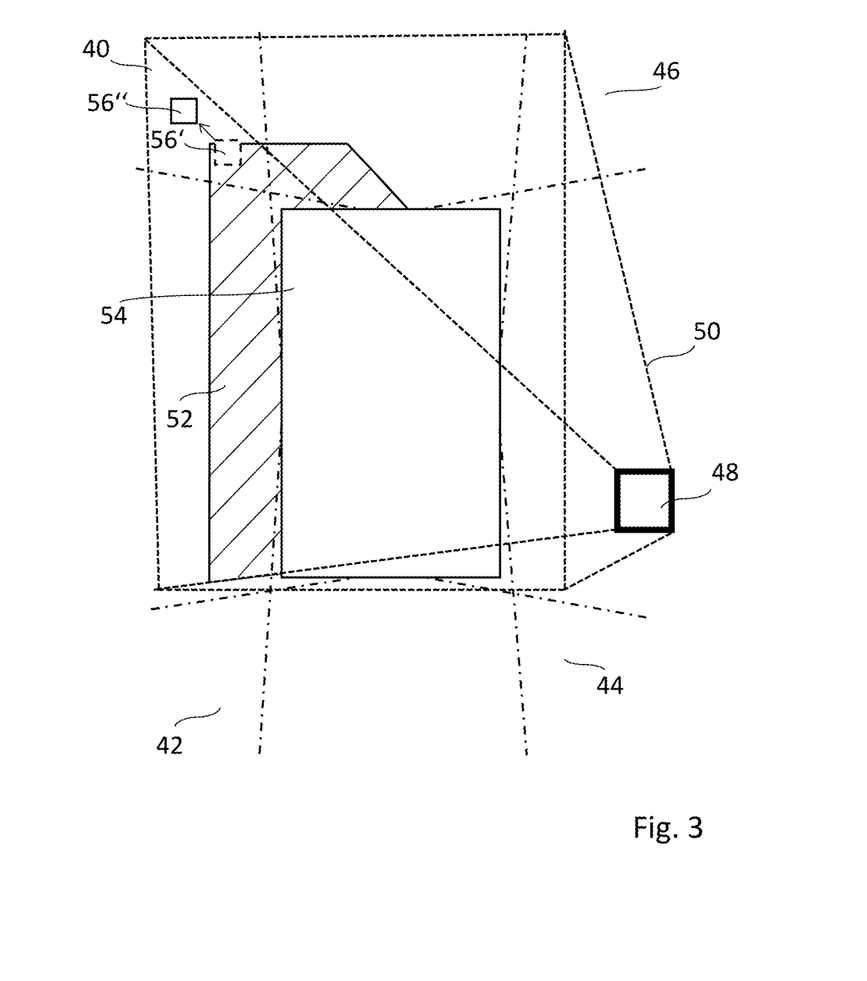
FIG. 3: shows a schematic top view of a virtual representation of vehicle surroundings.

FIG. 3 shows a schematic top view of a virtual representation of vehicle surroundings. Image regions of camera images are depicted by dash-dotted lines, wherein adjacent camera images have overlapping image regions 40, 42, 44, 46. A vehicle model 54 is integrated in the virtual representation. Furthermore, a virtual camera 48 is depicted in FIG. 3. The virtual camera 48 is arranged on the right next to the vehicle model 54 and has a field of vision 50 which substantially points from the bottom right to the top left and comprises the vehicle model 54 (depicted by a dashed line), wherein the vehicle model 54 conceals a region 52 of the virtual representation from the virtual camera 48.

A first selection region 56' is arranged in the overlapping image region 40 of a first and of a second vehicle camera. According to the present disclosure, the selection region 56' may be arranged at a standard position, in a first step, and it is then verified whether the selection region 56' is visible to the virtual camera 48. If this is not the case, then the selection region may be 40 displaced within the overlapping image region. As FIG. 3 shows, the selection region 56' lies in the concealed region 52 and is, accordingly, not visible to the virtual camera 48. The first selection region 56' is therefore displaced and the selection region 56" is, for example, obtained.

Figure 4:
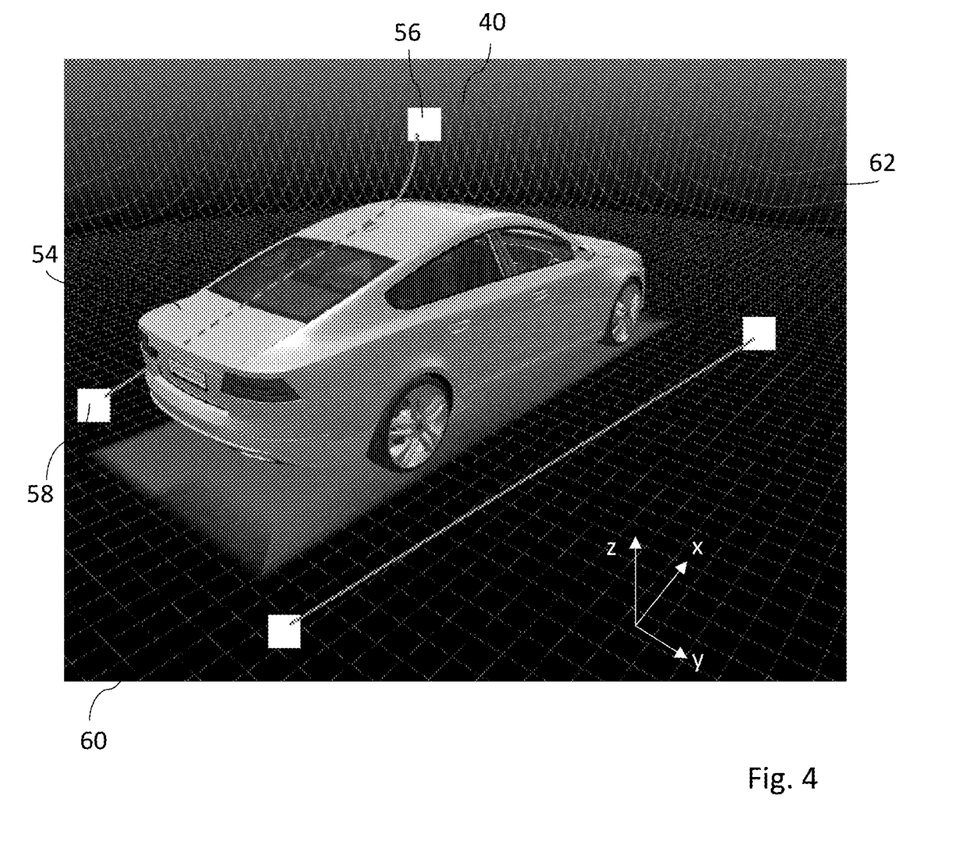
FIG. 4: shows a schematic view of a virtual camera.

FIG. 4 shows a schematic view of a virtual camera. A vehicle model 54 is integrated in the virtual three-dimensional space 60. The vehicle model 54 is enclosed by a virtual projection surface 62, wherein the virtual projection surface 62 is substantially configured in the form of a bowl and has a substantially planar bottom and the vehicle model 54 may be arranged on the bottom.

The virtual camera is arranged on a right side behind a vehicle model 54 and points in the direction of a front left overlapping image region 40.

A selection region 56 is arranged in the overlapping image region 40. The selection region 56 is arranged in the wall region of the projection surface 62. In particular, the selection region 56 does not lie on the bottom or the selection region 56 is arranged above the X and Y axis. If the selection region 56 were to lie in the overlapping image region 40 on the X axis, as is fundamentally the case according to the prior art, the latter would not be visible to the virtual camera 48 here. Furthermore, a second selection region 58 is shown in FIG. 4, which is arranged in an overlapping image region 42 of a second and a third vehicle camera. The selection region 58 is arranged on the bottom of the virtual projection surface 62. It consequently has a Z coordinate value of 0, in particular. The selection regions 56, 58 are, accordingly, not arranged on the same coordinate axis and may have different values in all 3 coordinate axes. In the selection regions 56, 58, at least one image parameter of one of the vehicle cameras, which have the corresponding overlapping image region, is calculated and, following this, at least one image parameter of a vehicle camera, which also has the overlapping image region, is adjusted thereto. At least one image parameter of a lateral vehicle camera may be adjusted to at least one image parameter of a front and/or rear vehicle camera. With reference to FIG. 4, this means that an image parameter of a front vehicle camera 20 is calculated in the selection region 56 and then an image parameter of a left vehicle camera 14 is adjusted. In the selection region 58, an image parameter of a rear vehicle camera 16 is calculated and then an image parameter of a left vehicle camera 14 is adjusted. In the case of the vehicle camera which comprises both selection regions 56, 58, the image parameters may be adjusted between the selection regions 56, 58 by means of an interpolation. This is depicted in FIG. 4 by the line or curve which connects the selection regions 56, 58 to one another. As distinguished from what is known from the prior art, the line does not only run along a single axis. The positions of the selection regions 56, and the X, Y and/or Z coordinate values of a currently rendered point are considered during the interpolation.

The invention has been described above with reference to exemplary embodiments. It is understood that numerous amendments and modifications are possible, without departing from the scope of protection defined by the claims. A combination of the various exemplary embodiments is also possible.

LIST OF REFERENCE NUMERALS

12 First vehicle camera
14 Second vehicle camera
16 Third vehicle camera
18 Fourth vehicle camera
20 Field of vision of first vehicle camera
22 Field of vision of second vehicle camera
24 Field of vision of third vehicle camera
26 Field of vision of fourth vehicle camera
28 Overlapping region of first/second vehicle camera 30 Overlapping region of second/third vehicle camera
32 Overlapping region of third/fourth vehicle camera
34 Overlapping region of fourth/first vehicle camera
36 Computing unit
38 Apparatus
40 Overlapping image region of first/second vehicle camera
42 Overlapping image region of second/third vehicle camera
44 Overlapping image region of third/fourth vehicle camera
46 Overlapping image region of fourth/first vehicle camera
48 Virtual camera
50 Field of vision of virtual camera
52 Region concealed from virtual camera
54 Vehicle model
56(')/('') First selection region
58 Second selection region
60 Virtual three-dimensional space
62 Virtual projection surface
S1-S11 Method steps

The invention claimed is:

1. A method for generating an image of vehicle surroundings, comprising:
   capturing vehicle surroundings by a plurality of vehicle cameras which, in particular, are arranged on a vehicle body of a vehicle,
   generating camera images by the plurality of vehicle cameras, wherein the camera images of adjacent vehicle cameras have overlapping image regions,
   generating a virtual representation of the surroundings in a three-dimensional virtual space, wherein, during the generation, the camera images are projected onto a virtual projection surface in the three-dimensional virtual space,
   providing a non-stationary virtual camera in the three-dimensional virtual space and determining at least one of a virtual camera position or a virtual camera orientation,
   placing a first selection region on the virtual projection surface in a first overlapping image region of the overlapping image regions depending on a field of vision of the virtual camera,
   calculating at least one image parameter of a first vehicle camera of the plurality of vehicle cameras in the first selection region, and
   adjusting at least one image parameter of a second vehicle camera of the plurality of vehicle cameras to the at least one image parameter of the first vehicle camera in the first selection region.

2. The method according to claim 1, further comprising:
   placing a second selection region on the virtual projection surface within a second overlapping image region of the overlapping image regions depending on the field of vision of the virtual camera,
   calculating at least one image parameter of a further vehicle camera of the plurality of vehicle cameras, the camera image of which has the second overlapping image region, in the second selection region,
   adjusting at least one image parameter of another vehicle camera of the plurality of vehicle cameras, the camera image of which likewise has the second overlapping image region, to the at least one image parameter of the further vehicle camera in the second selection region, wherein the further vehicle camera comprises a first one of the second vehicle camera or a third vehicle camera of the plurality of vehicle cameras, and the another vehicle camera comprises a second one of the second vehicle camera or the third vehicle camera.

3. The method according to claim 2, wherein the another vehicle camera comprises the second vehicle camera and the further vehicle camera comprises the third vehicle camera, and wherein the at least one image parameter of the second vehicle camera, which has the first and the second overlapping image regions, is adjusted between the first and the second selection regions by interpolation.

4. The method according to claim 3, wherein at least one of a position of the first selection region, a position of the second selection region, or X, Y and Z coordinate values of a currently rendered point is/are considered during the interpolation.

5. The method according to claim 1, wherein the placing of the first selection region comprises:
   placing the first selection region at a standard position within the first overlapping image regions,
   verifying whether the first selection region is visible to the virtual camera at the standard position, and
   displacing the first selection region to a first position, spaced apart from the standard position, on the virtual projection surface within the first overlapping image region if the selection region at the standard position is not visible to the virtual camera, wherein the first position is visible to the virtual camera, and wherein the at least one image parameter of the first vehicle camera is calculated in the first selection region at the first position.

6. The method according to claim 5, wherein the standard position is used as an evasive position if no selection region visible to the virtual camera can be ascertained.

7. The method according to claim 1, further comprising providing parameters of a vehicle model, and integrating the parameters of the vehicle model in the three-dimensional virtual space.

8. The method according to claim 1, wherein the at least one image parameters of the first and second vehicle cameras comprise at least one of an image brightness, an image contrast, an image color, an image sharpness, a color saturation, or a texture frequency.

9. The method according to claim 1, further comprising:
   placing a second selection region on the virtual projection surface within a second overlapping image region of the overlapping image regions depending on the field of vision of the virtual camera,
   calculating at least one image parameter of a further vehicle camera of the plurality of vehicle cameras, the camera image of which has the second overlapping image region, in the second selection region, and
   adjusting at least one image parameter of another vehicle camera, the camera image of which likewise has the second overlapping image region, to the at least one image parameter of the further vehicle camera of the plurality of vehicle cameras in the second selection region,
   wherein the first vehicle camera is a front vehicle camera and/or the further vehicle camera is a rear vehicle camera, or the first vehicle camera is a rear vehicle camera and/or the further vehicle camera is a front vehicle camera.

10. The method according to claim 1, wherein the second vehicle camera is a left side or a right side vehicle camera.

11. An apparatus for generating an image of vehicle surroundings, comprising:

a plurality of vehicle cameras for capturing vehicle surroundings and producing camera images, wherein the camera images of adjacent vehicle cameras have overlapping image regions, and wherein the vehicle cameras are in particular mounted on a vehicle bodywork of a vehicle, and a computing unit having one or more inputs coupled to outputs of the vehicle cameras for receiving the camera images, the computing unit being is configured to generate a virtual representation of the surroundings in a three-dimensional virtual space, wherein, during the generation, the camera images are projected onto a virtual projection surface in the three-dimensional virtual space, and to provide a non-stationary virtual camera in the three-dimensional virtual space, wherein the computing unit is furthermore configured to place a first selection region on the virtual projection surface in a first overlapping image region depending on a field of vision of the virtual camera, to calculate at least one image parameter of a first vehicle camera in the first selection region, and to adjust at least one image parameter of a second vehicle camera to the at least one image parameter of the first vehicle camera in the first selection region.

12. The apparatus according to claim 11, wherein the computing unit is furthermore configured to place a second selection region on the virtual projection surface within a second overlapping image region depending on the field of vision of the virtual camera, to calculate at least one image parameter of a further vehicle camera, the camera image of which has the second overlapping image region, in the second selection region, and to adjust at least one image parameter of another vehicle camera, the camera image of which likewise has the second overlapping image region, to the at least one image parameter of the further vehicle camera in the second selection region.

13. An apparatus for generating an image of vehicle surroundings, comprising:
a computing unit having a plurality of input terminals, the computing unit configured for
receiving, at the plurality of input terminals of the computing unit, camera images from a plurality of vehicle cameras arranged on a vehicle, the camera images of adjacent vehicle cameras having overlapping image regions, the plurality of input terminals coupled to output terminals of the plurality of vehicle cameras,
generating a virtual representation of the surroundings in a three-dimensional virtual space, wherein, during the generation, the camera images are projected onto a virtual projection surface in the three-dimensional virtual space,
providing a non-stationary virtual camera in the three-dimensional virtual space and determining at least one of a virtual camera position or a virtual camera orientation,
placing a first selection region on the virtual projection surface in a first overlapping image region of the overlapping image regions depending on a field of vision of the virtual camera,
calculating at least one image parameter of a first vehicle camera of the plurality of vehicle cameras in the first selection region, and
adjusting at least one image parameter of a second vehicle camera of the plurality of vehicle cameras to the at least one image parameter of the first vehicle camera in the first selection region.

14. The apparatus according to claim 13, wherein the placing of the first selection region comprises:
placing the first selection region at a standard position within the first overlapping image region,
verifying whether the first selection region is visible to the virtual camera at the standard position, and
displacing the first selection region to a first position, spaced apart from the standard position, on the virtual projection surface within the first overlapping image region if the selection region at the standard position is not visible to the virtual camera, wherein the first position is visible to the virtual camera, and wherein the at least one image parameter of the first vehicle camera is calculated in the first selection region at the first position.

15. The apparatus according to claim 14, wherein the computing unit is further configured for providing parameters of a vehicle model and integrating the parameters of the vehicle model in the three-dimensional virtual space, wherein the selection region at the standard position is not visible to the virtual camera when the vehicle model is positioned between the selection region at the standard position and the virtual camera.

16. The apparatus according to claim 13, wherein the computing unit is further configured for
placing a second selection region on the virtual projection surface within a second overlapping image region of the overlapping image regions depending on the field of vision of the virtual camera,
calculating at least one image parameter of a further vehicle camera of the plurality of vehicle cameras, the camera image of which has the second overlapping image region, in the second selection region, and
adjusting at least one image parameter of another vehicle camera, the camera image of which likewise has the second overlapping image region, to the at least one image parameter of the further vehicle camera of the plurality of vehicle cameras in the second selection region,
wherein the first vehicle camera is a front vehicle camera and/or the further vehicle camera is a rear vehicle camera, or the first vehicle camera is a rear vehicle camera and/or the further vehicle camera is a front vehicle camera.

17. The apparatus according to claim 11, wherein the computing unit is further configured such that placing of the first selection region comprises:
placing the first selection region at a standard position within the first overlapping image region,
verifying whether the first selection region is visible to the virtual camera at the standard position, and
displacing the first selection region to a first position, spaced apart from the standard position, on the virtual projection surface within the first overlapping image region if the selection region at the standard position is not visible to the virtual camera, wherein the first position is visible to the virtual camera, and wherein the at least one image parameter of the first vehicle camera is calculated in the first selection region at the first position.

18. The apparatus according to claim 17, wherein the computing unit is further configured for providing parameters of a vehicle model and integrating the parameters of the vehicle model in the three-dimensional virtual space, wherein the selection region at the standard position is not visible to the virtual camera when the vehicle model is positioned between the selection region at the standard position and the virtual camera.

19. The apparatus of claim 11, wherein the computing unit is further configured to
- place a second selection region on the virtual projection surface within a second overlapping image region of the overlapping image regions depending on the field of vision of the virtual camera,
- calculate at least one image parameter of a further vehicle camera of the plurality of vehicle cameras, the camera image of which has the second overlapping image region, in the second selection region, and
- adjust at least one image parameter of another vehicle camera, the camera image of which likewise has the second overlapping image region, to the at least one image parameter of the further vehicle camera of the plurality of vehicle cameras in the second selection region,
- wherein the first vehicle camera is a front vehicle camera and/or the further vehicle camera is a rear vehicle camera, or the first vehicle camera is a rear vehicle camera and/or the further vehicle camera is a front vehicle camera.

20. The method according to claim 5, further comprising providing parameters of a vehicle model and integrating the parameters of the vehicle model in the three-dimensional virtual space, wherein the selection region at the standard position is not visible to the virtual camera when the vehicle model is positioned between the selection region at the standard position and the virtual camera.

* * * * *